US012789838B2

(12) United States Patent
Black et al.

(10) Patent No.: US 12,789,838 B2
(45) Date of Patent: Nov. 10, 2026

(54) SYSTEMS AND METHODS FOR PREDICTIVE RISK-AWARE CONTROL OF VEHICLES IN DYNAMIC ENVIRONMENTS

(71) Applicant: TOYOTA MOTOR ENGINEERING & MANUFACTURING NORTH AMERICA, INC., Plano, TX (US)

(72) Inventors: Mitchell Black, Ann Arbor, MI (US); Georgios Fainekos, Novi, MI (US); Bardh Hoxha, Canton, MI (US); Hideki Okamoto, Ann Arbor, MI (US); Danil Prokhorov, Canton, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 200 days.

(21) Appl. No.: 18/486,324

(22) Filed: Oct. 13, 2023

(65) Prior Publication Data

US 2025/0121849 A1 Apr. 17, 2025

(51) Int. Cl.
*B60W 60/00* (2020.01)
*B60W 30/08* (2012.01)

(52) U.S. Cl.
CPC .......... *B60W 60/001* (2020.02); *B60W 30/08* (2013.01); *B60W 2300/14* (2013.01)

(58) Field of Classification Search
CPC ............... B60W 60/001; B60W 30/08; B60W 2300/14; B60W 30/095; B60W 30/09
See application file for complete search history.

(56) References Cited

U.S. PATENT DOCUMENTS

2020/0086859 A1* 3/2020 McGill, Jr. ........... B60W 10/04
2021/0009121 A1* 1/2021 Oboril ............... B60W 30/0953
2022/0126876 A1 4/2022 Tebbens et al.
2023/0064332 A1 3/2023 Akrotiriabnakis et al.
2023/0150485 A1 5/2023 Hafner et al.
2023/0150532 A1* 5/2023 Hafner ................ B60W 60/001 701/23
2023/0182721 A1 6/2023 Srinivasan et al.
2023/0384790 A1* 11/2023 Singletary ......... B60W 50/0098
2024/0010232 A1* 1/2024 Karkus ............. B60W 50/0097
2024/0075955 A1* 3/2024 Chen ..................... B60W 30/02

OTHER PUBLICATIONS

Breeden, J. & Panagou, D., "Predictive Control Barrier Functions for Online Safety Critical Control", 2022, 2022 IEEE 61st Conference on Decision and Control (CDC), Cancun, Mexico, 2022, pp. 924-931, doi: 10.1109/CDC51059.2022.9992926 (Year: 2022).*

(Continued)

*Primary Examiner* — Isaac G Smith
*Assistant Examiner* — Nikki Marie M Molina
(74) *Attorney, Agent, or Firm* — HAYNES AND BOONE, LLP

(57) ABSTRACT

System, methods, and other embodiments described herein relate to implementing predictive, risk-aware control barrier functions, the effects of which certify using predicted future trajectories of the probability of vehicles (such as tractor-trailers) becoming unsafe over a time interval remain bounded by a user-specified value.

23 Claims, 10 Drawing Sheets

(56) References Cited

OTHER PUBLICATIONS

Aali et al., Multiple Control Barrier Functions: An Application to Reactive Obstacle Avoidance for a Multi-steering Tractor-trailer System, 2022 IEEE 61st Conference on Decision and Control (CDC), Dec. 6-9, 2022, Cancun, Mexico, pp. 6993-6998.
Black et al., Safety Under Uncertainty: Tight Bounds with Risk-Aware Control Barrier Functions, arXiv:2304.01040, 2023.
Chen et al, Enhancing the Performance of a Safe Controller Via Supervised Learning for Truck Lateral Control, Journal of Dynamic Systems Measurement and Control, vol. 141, Issue 10, Oct. 2019.
He et al., Improving Fuel Economy of Heavy-Duty Vehicles in Daily Driving, 2020 IEEE American Control Conference (ACC), Jul. 1-3, 2020, Denver, CO, USA, pp. 2306-2311.
Srinivasan et al., Extent-Compatible Control Barrier Functions, Systems & Control Letters, vol. 150, Apr. 2021.

* cited by examiner

SYSTEMS AND METHODS FOR PREDICTIVE RISK-AWARE CONTROL OF VEHICLES IN DYNAMIC ENVIRONMENTS

TECHNICAL FIELD

The subject matter described herein relates, in general, to control barrier functions, and, more particularly, to implementing predictive risk-bounded control barrier functions.

BACKGROUND

Vehicles with autonomous driving assistance features may utilize methods such as control barrier functions to try and ensure that vehicle control inputs do not result in the vehicle entering an unsafe state of operation (e.g., colliding with another vehicle). Current development of control barrier functions in a stochastic setting has leaned heavily on martingale theory for both discrete-time and continuous-time stochastic processes.

SUMMARY

In certain illustrative embodiments, a system is described which includes a processor and memory communicably coupled to the processor. The memory stores machine-readable instructions that, when executed by the processor, cause the processor to predict a state of a vehicle, plan a trajectory based on the state of the vehicle, determine a present control input based on the trajectory, apply a predictive risk-aware control barrier function ("PRA-CBF") to determine a final control input, and apply the final control input to the vehicle. In determining the final control input, the PRA-CBF takes a predicted control input into account when assessing risks associated with the present control input.

In yet another illustrative embodiment, a non-transitory computer-readable medium is described which includes instructions that, when executed by one or more processors, cause the one or more processors to predict a state of a vehicle, plan a trajectory based on the state of the vehicle, determine a present control input based on the trajectory, apply a PRA-CBF to determine a final control input, and apply the final control input of the vehicle. In determining the final control input, the PRA-CBF takes a predicted control input into account when assessing risks associated with the present control input.

In another illustrative embodiment, a method is described that comprises a method, predicting a state of a vehicle, planning a trajectory based on the state of the vehicle, determining a present control input based on the trajectory, applying a PRA-CBF to determine a final control input, and applying the final control input to the vehicle. In determining the final control input, the PRA-CBF takes a predicted control input into account when assessing risks associated with the present control input.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
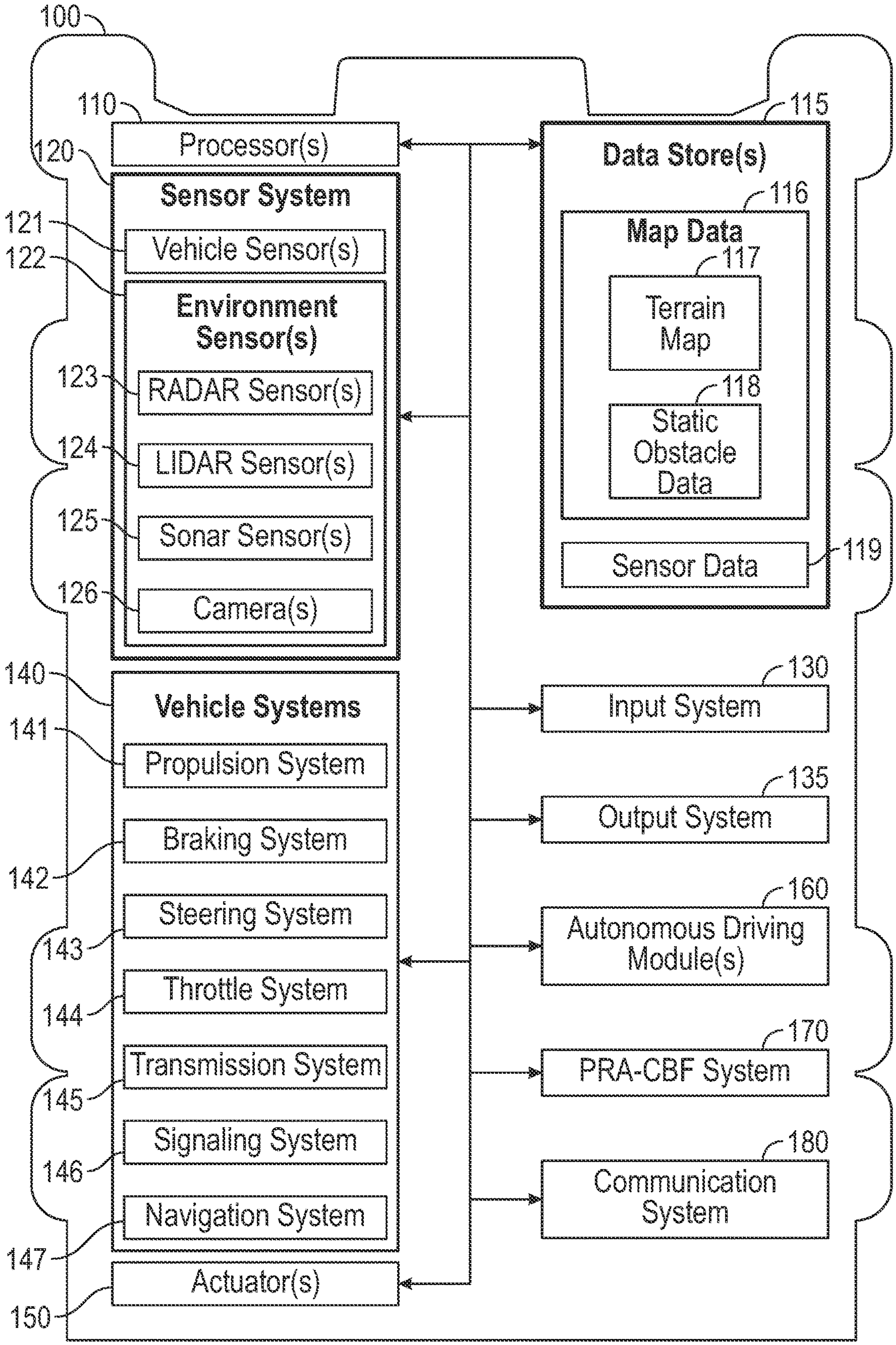
FIG. 1 illustrates one embodiment of a vehicle within which systems and methods disclosed herein may be implemented.

Systems, methods, and other embodiments associated with implementing predictive risk-bounded control barrier functions in vehicles are disclosed herein. The present disclosure is applicable to a variety of vehicle systems including, for example, Advance Driver Assistance or Automated Driving systems. The present disclosure constitutes an approach for risk-aware, autonomous control design of a vehicle system (e.g., truck tractor-trailer system) using model predictive control ("MPC") and predictive risk-aware control barrier functions ("PRA-CBFs"), i.e., MPC+PRA-CBFs. For example, the truck-trailer system ("TTS") is notoriously difficult to control, even for experienced human drivers in ideal road conditions. Moreover, the presence of other vehicles on the road as well as complicating factors such as inclement weather, deteriorating roadways, etc., renders the environment in which a TTS must operate both dynamic and uncertain. As such, it is necessary for any controller to have a formal, mathematical understanding of the risk incurred by taking its computed actions, and to be able to bound that risk according to some design tolerance. Accordingly, illustrative embodiments of the present disclosure introduce frameworks for accomplishing such tasks for the TTS modeled as a stochastic differential equation ("SDE") by using predictive, risk-aware control barrier functions, the effects of which certify using predicted future trajectories that the probability of the TTS becoming unsafe over a time interval remains bounded by a user-specified value.

There are disadvantages to conventional approaches. For example, MPC may exhibit strong closed-loop performance by solving an optimal control problem over some finite time interval, but it does not provide a straightforward way to characterize the risk associated with the TTS throughout this time period. On the other hand, conventional risk-aware control barrier functions do not take future (predicted) control actions into account when assessing the risk associated with any present control action. In the TTS, where the truck and trailer centers of mass may be accelerating in different directions at different time instances, it is critical to be able to assess this risk over the predicted future trajectories rather than at any instantaneous time instance.

The illustrative embodiments described herein provide a solution to these disadvantages. In the disclosed embodiments, by using the solution to the MPC problem as a nominal path for the PRA-CBF, the risks of the TTS over future time intervals are more accurately estimated and thus contained within the acceptable levels. Additionally, if ever the predicted risk is in jeopardy of exceeding the tolerable threshold, the PRA-CBF of the present disclosure admits an affine (linear) inequality condition and, thus, may be included as a constraint in a quadratic program-based control law, the solution to which represents the set of control actions which both satisfy the PRA-CBF condition and minimally deviate from the MPC solution.

We will now discuss the problem faced and overcome by the present disclosure. The problem under consideration is the following: given the SDE model of the TTS, a set of state constraints (e.g., obstacle/collision avoidance, speed limit, truck-trailer jackknife angle, etc.), and a finite operating time interval, design a control law such that the risk of the TTS violating any constraint over the time interval is bounded according to some acceptable risk threshold.

Risk-aware control design is an active area of research with application to many autonomous systems. For generic systems, it has become popular to design controllers such that, with respect to a probability distribution of outcomes, a given risk metric specification (e.g., expected value, value-at-risk ("VaR"), conditional value-at-risk ("CVaR"), etc.) is satisfied over the operating time. Some recent work has even used control barrier functions to encode the satisfaction of these risk specifications. However, the existing approaches are prone to myopic tendencies in that they do not provide any assessment of risk over a prediction interval. Other approaches require sampling from future predicted trajectories in order to generate an estimate of the risk associated with future trajectories, and therefore tend to provide guarantees of bounded risk only as the number of samples grows very large.

For systems modeled as stochastic differential equations, several works employ the use of stochastic control barrier functions to bound the probability of constraint violation over a finite time interval. These approaches have been shown to lead to conservative system behavior, however, which tends to impact the ability of the system to meet other performance specifications, such as goal-reaching or trajectory tracking.

Specific to the TTS, some conventional approaches seek to design MPC-CBF control laws for guaranteed safety under the assumption of a perfect system model and perfect state measurements. Not only are these assumptions unrealistic in practice, but the CBFs used to filter out potentially unsafe MPC-generated inputs do not account for the prediction of future state trajectories, which may lead to the same myopic behavior as when no MPC is used in the first place. In addition, the use of present-focused CBFs is more likely to result in constraints that cannot be jointly satisfied due to the geometry of the TTS. By including prediction in embodiments of the present disclosure, we can ascertain whether the constraints will in fact be satisfied throughout the predicted maneuver—thus providing a solution over the disadvantages of conventional approaches.

As described herein, embodiments of the present disclosure provide a number of advantages over conventional approaches. First, in contrast to sampling-based approaches, which rely on large numbers of sampled trajectories to obtain probabilistic bounds on risk, the PRA-CBF approach of the present disclosure is a formal method for certifying risk in system behavior and provides a certificate that the risk threshold will be always satisfied.

Second, while conventional risk-aware control barrier functions have been shown to reduce conservatism associated with risk-aware control design, they nevertheless are prone to producing myopic system behavior (system behavior prioritizes the instantaneous rate of change of the values of the constraint functions over their evolution across a time interval) in the sense that the present judgement of risk may be significantly higher than the actual risk incurred along a proposed future trajectory. The use of the PRA-CBFs of the present disclosure to encode a prediction of future states and control actions mitigates this problem, and results in the controller tolerating actions that are less conservative in nature while still abiding by the specified risk tolerance.

Third, conventional approaches to CBF-based TTS control simply layer a CBF filter on top of the nominal MPC policy. While providing formal guarantees of safety under strict assumptions, the trajectories predicted by the MPC are completely decoupled from the CBF filter, which considers only the present state in its judgement of what constitutes an admissible control input. In practice, this often means that even trajectories that remain safe over the prediction time interval are deemed either i) inadmissible by the CBF filter, which adds unnecessary conservatism to the system, or ii) infeasible altogether, at which point the controller ceases to reliably operate. By using MPC as a nominal/predicted path, embodiments of the present MPC+PRA-CBF approach are equipped to judge the effect of the proposed control actions on the risk incurred by the TTS over the full future time interval, which leads to more accurate risk assessment and reduces conservatism.

Referring to FIG. 1, an example of a vehicle 100 is shown, according to an illustrative embodiment of the present disclosure. As used herein, a "vehicle" is any form of motorized transport (e.g., water, ground or airborne vehicles). In one or more examples described herein, the vehicle 100 is a tractor-trailer. While arrangements will be described herein with respect to tractor-trailers, it will be understood that embodiments are not limited to tractor-trailers. In some implementations, the vehicle 100 may be any robotic device or form of motorized transport that, for example, includes sensors to perceive aspects of the surrounding environment, and thus benefits from the functionality discussed herein associated with implementing predictive risk-bounded control barrier functions. As a further note, this disclosure generally discusses the vehicle 100 as traveling on a roadway with surrounding vehicles, which are intended to be construed in a similar manner as the vehicle 100 itself. That is, the surrounding vehicles can include any vehicle that may be encountered on a roadway by the vehicle 100.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1.

In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-10 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand the embodiments described herein may be practiced using various combinations of these elements. In either case, the vehicle 100 includes an PRA-CBF system 170 that is implemented to perform methods and other functions as disclosed herein relating to implementing predictive risk-bounded control barrier functions. As will be discussed in greater detail subsequently, the PRA-CBF system 170, in various embodiments, is implemented partially within the vehicle 100, and as a cloud-based service. For example, in one approach, functionality associated with at least one module of the PRA-CBF system 170 is implemented within the vehicle 100 while further functionality is implemented within a cloud-based computing system.

Figure 2:
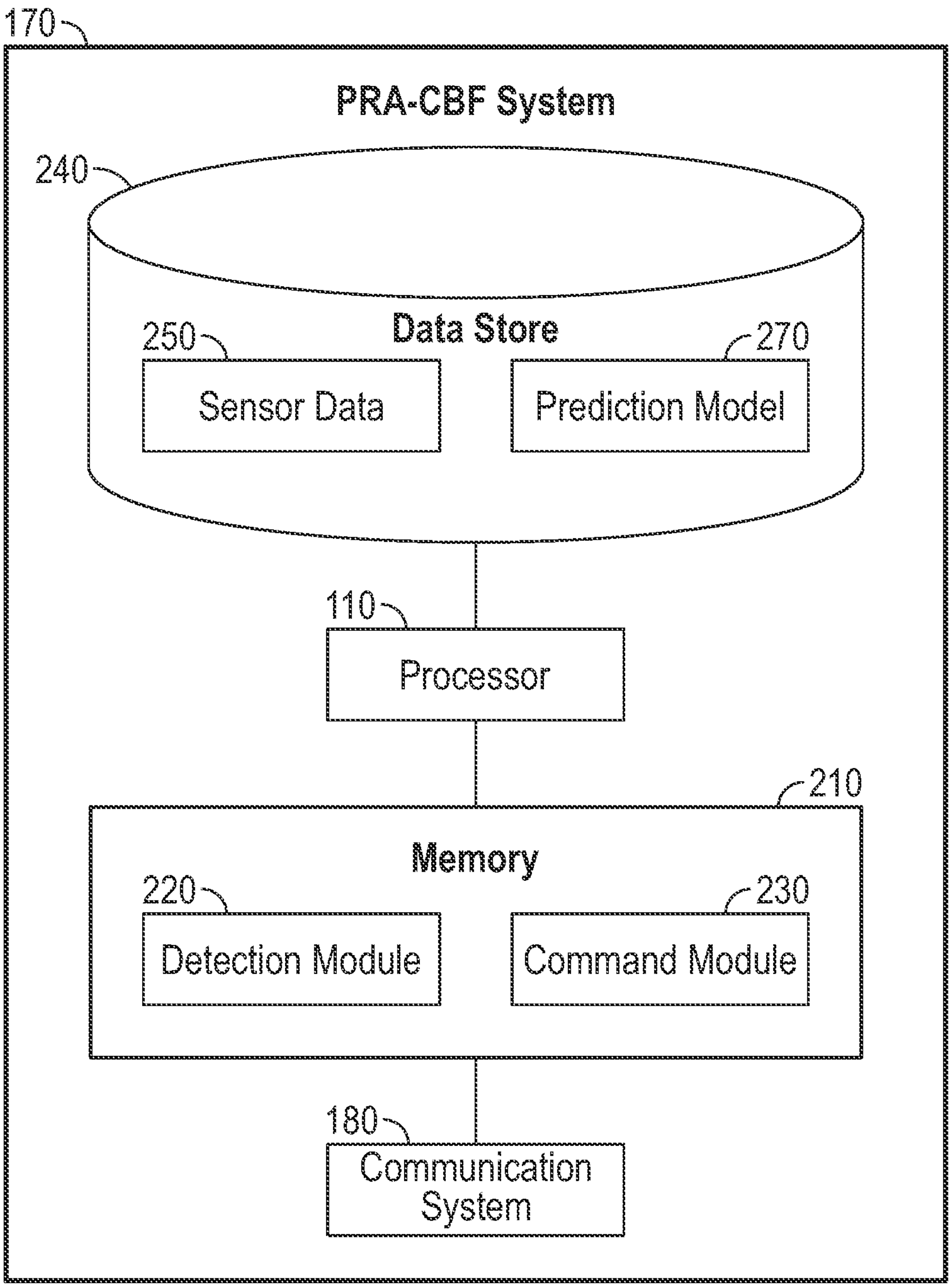
FIG. 2 illustrates one embodiment of a PRA-CBF system that is associated with implementing risk-bounded control barrier functions.

With reference to FIG. 2, one embodiment of the PRA-CBF system 170 of FIG. 1 is further illustrated. The PRA-CBF system 170 is shown as including a processor 110 from the vehicle 100 of FIG. 1. Accordingly, the processor 110 may be a part of the PRA-CBF system 170, the PRA-CBF system 170 may include a separate processor from the processor 110 of the vehicle 100, or the PRA-CBF system 170 may access the processor 110 through a data bus or another communication path 180. In one embodiment, the PRA-CBF system 170 includes a memory 210 that stores a detection module 220 and a command module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Figure 3:
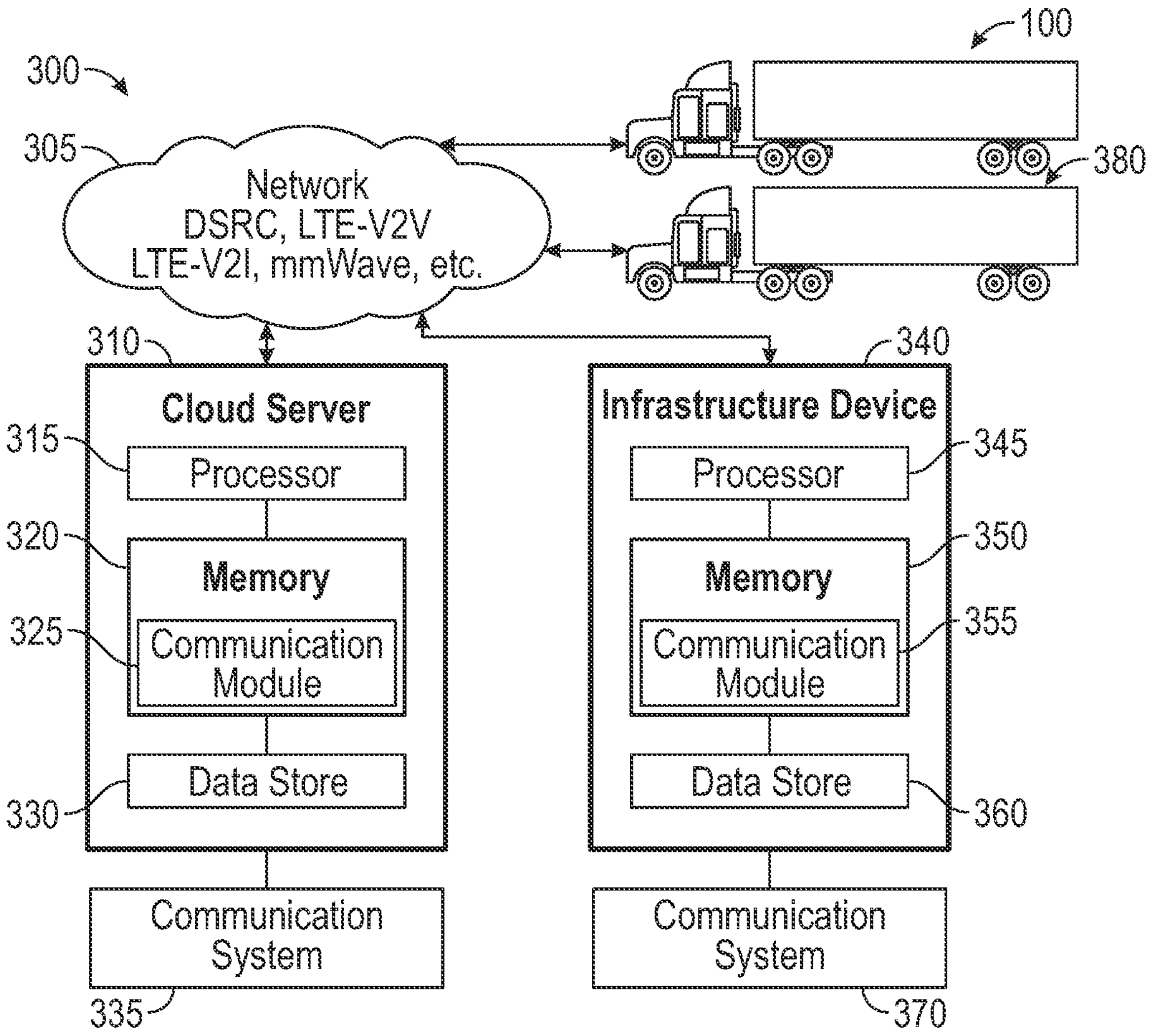
FIG. 3 illustrates one embodiment of the PRA-CBF system of FIG. 2 in a cloud-computing environment.

The PRA-CBF system 170 as illustrated in FIG. 2 is generally an abstracted form of the PRA-CBF system 170 as may be implemented between the vehicle 100 and a cloud-computing environment. FIG. 3, which is further described below, illustrates one example of a cloud-computing environment 300 that may be implemented along with the PRA-CBF system 170. As illustrated in FIG. 3, the PRA-CBF system 170 may be embodied at least in part within the cloud-computing environment 300.

With reference to FIG. 2, the detection module 220 generally includes instructions that function to control the processor 110 to receive data inputs from one or more sensors of the vehicle 100. The inputs are, in one embodiment, observations of one or more objects in an environment proximate to the vehicle 100 and/or other aspects about the surroundings. As provided for herein, the detection module 220, in one embodiment, acquires sensor data 250 that includes at least camera images. In further arrangements, the detection module 220 acquires the sensor data 250 from further sensors such as a radar 123, a LiDAR 124, and other sensors as may be suitable for identifying vehicles and locations of the vehicles. In one embodiment, detection module 220 may also acquire sensor data 250 from one or more sensors that allow for implementing the illustrative predictive risk-bounded control barrier functions described herein.

Accordingly, the detection module 220, in one embodiment, controls the respective sensors to provide the data inputs in the form of the sensor data 250. Additionally, while the detection module 220 is discussed as controlling the various sensors to provide the sensor data 250, in one or more embodiments, the detection module 220 can employ other techniques to acquire the sensor data 250 that are either active or passive. For example, the detection module 220 may passively acquire the sensor data 250 from a stream of electronic information provided by the various sensors to further components within the vehicle 100. Moreover, the detection module 220 can undertake various approaches to fuse data from multiple sensors when providing the sensor data 250 and/or from sensor data acquired over a wireless communication link (e.g., v2v) from one or more of the surrounding vehicles. Thus, the sensor data 250, in one embodiment, represents a combination of data acquired from multiple sensors.

In addition to locations of surrounding vehicles, the sensor data 250 may also include, for example, information about lane markings, and so on. Moreover, the detection module 220, in one embodiment, controls the sensors to acquire the sensor data 250 about an area that encompasses 360 degrees about the vehicle 100 in order to provide a comprehensive assessment of the surrounding environment. Of course, in alternative embodiments, the detection module 220 may acquire the sensor data about a forward direction alone when, for example, the vehicle 100 is not equipped with further sensors to include additional regions about the vehicle and/or the additional regions are not scanned due to other reasons (e.g., unnecessary due to known current conditions).

Moreover, in one embodiment, the PRA-CBF system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, and so on.

In one embodiment, the command module 230 generally includes instructions that function to control the processor 110 or collection of processors in the cloud-computing environment 300 for implementing the illustrative predictive risk-bounded control barrier functions described herein. With regard to implementing predictive risk-bounded control barrier functions, a class of tractor-trailer dynamical systems may be represented by the following non-linear, control-affine, stochastic differential equation (SDE):

$$dX_t = (f(X_t) + g(X_t)u(X_t))dt + \sigma(X_t)dW_t, \quad \text{Eq. 1}$$

where $$X_t = \begin{bmatrix} x \\ y \\ v \\ a \\ \theta_1 \\ \theta_2 \\ \delta \end{bmatrix}, f(X_t) = \begin{bmatrix} v\cos\theta_1 \\ v\sin\theta_1 \\ a \\ 0 \\ \frac{v}{l_1}\tan\delta \\ \frac{v}{l_2}\left(\sin(\theta_1 - \theta_2) - \frac{l_h}{l_1}\cos(\theta_1 - \theta_2)\tan\delta\right) \\ 0 \end{bmatrix},$$

$$g(X_t) = \begin{bmatrix} 0 & 0 \\ 0 & 0 \\ 0 & 0 \\ 1 & 0 \\ 0 & 0 \\ 0 & 0 \\ 0 & 1 \end{bmatrix},$$

and where $x_t$ denotes the state $x_t \in \mathcal{X} \subseteq \mathbb{R}^n$, which consists of lateral position x, longitudinal position y, longitudinal velocity of the rear truck axle v, longitudinal acceleration of the rear truck axle a, orientation of the truck body with respect to the horizontal $\theta_1$, orientation of the trailer body with respect to the horizontal $\theta_2$, and steering angle $\delta$. In addition, $f$ denotes the control-independent drift function $f$: $\mathbb{R}^n \to \mathbb{R}^n$, g denotes the control-independent drift function g: $\mathbb{R}^n \to \mathbb{R}^{n\times m}$, $u_t$ denotes the control input vector $u_t \in \mathcal{U} \subseteq \mathbb{R}^m$ at time t consisting of longitudinal rear axle jerk j and rate of change of steering angle $\omega$, $\sigma$ denotes a positive semi-definite, diagonal diffusion function $\sigma$: $\mathbb{R}^n \to \mathbb{R}^{n\times q}$ whose elements depend on the level of stochastic noise assumed in the system, and $w_t$ denotes a standard q-dimensional Wiener process (also known as Brownian motion) defined over the complete probability space ($\Omega$, $\mathcal{F}$, P) for sample space $\Omega$, $\sigma$-algebra $\mathcal{F}$ over $\Omega$, and probability measure P: $\mathcal{F} \to [0, 1]$.

Figure 4:
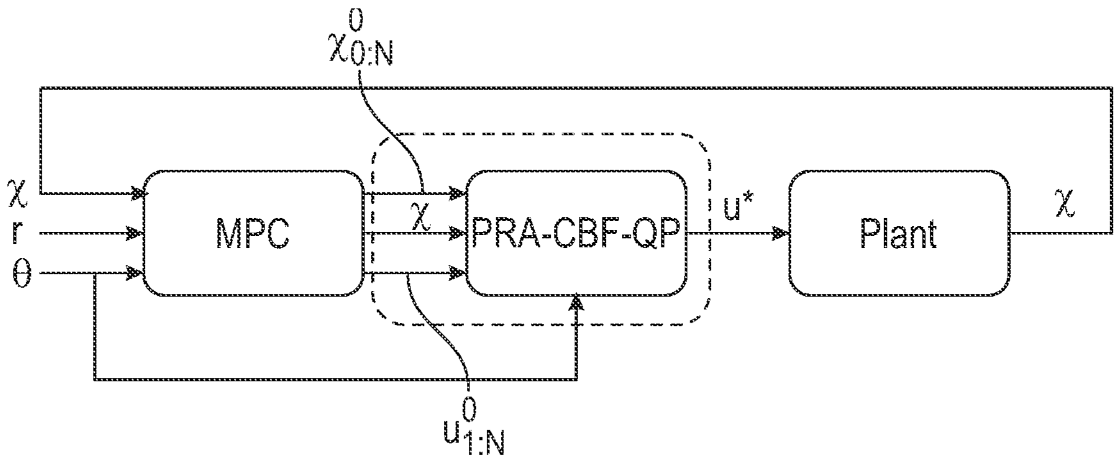
FIG. 4 illustrates one embodiment of the PRA-CBF architecture, according to certain illustrative embodiments of the present disclosure.

In the embodiments disclosed herein, one key feature of the present disclosure is the re-formulation of control barrier functions as a novel PRA-CBF directly using the MPC as a predicted trajectory for future risk assessment. FIG. 4 is a diagram of a control architecture for illustrative embodiments of the present disclosure combining the MPC and PRA-CBF. In FIG. 4, the state is denoted by x, some reference signal r, and control parameters theta. The MPC of the present disclosure uses a dynamic model of the TTS that is differentially flat (as shown in FIG. 4), which means there exists a mapping from the inputs of the TTS nonlinear model to an analogous linear model, in this case a 2-dimensional triple integrator model with state $x_l = [x\ y\ v_x\ v_y\ a_x\ a_y]$ (x-position, y-position, x-velocity, y-velocity, x-acceleration, and y-acceleration) and control $u_l = [j_x\ j_y]$ (x-jerk and y-jerk), and vice versa. Due to this property, the system formulates a linear MPC problem and directly transform the x-jerk and y-jerk to the longitudinal jerk j and steering angular velocity inputs $\omega$ of the TTS. This feature allows the system to quickly solve the MPC problem while obtaining the full control solution over the predicted time interval.

Then, still with reference to FIG. 4, the predicted state and control trajectories (the solutions to the MPC problem), the current state x, and control parameters theta are fed into the PRA-CBF-QP control law. The objective function is the squared distance of the control solution u* from the desired control at the present time, denoted $u_1^0$. The constraints in the optimization problem are PRA-CBF constraints, which for the TTS are affine in the control input (and thus the optimization problem is a quadratic program ("QP"), which may be solved very efficiently online) and take the following form:

$$a(x_{0:N}, u_{1:N}) + b^\top(x_{0:N}, u_{1:N})u \geq \alpha(\mu(x_{0:N}, u_{1:N}) + v\,\mathrm{erf}^{-1}(1-\rho)), \quad \text{Eq. 2}$$

where a: $\mathbb{R}^{n\times(N+1)} \times \mathbb{R}^{m\times N} \to \mathbb{R}$ and b: $\mathbb{R}^{n\times(N+1)} \times \mathbb{R}^{m\times N} \to R^m$ depend on the chosen CBF, the minimum predicted value of which over the considered time interval is given by $\mu$, and where $\alpha$: $\mathbb{R} \to \mathbb{R}$ is a class K function, $v \in \mathbb{R}$ is a system-dependent robustness parameter, and $\rho \in (0,1)$ is the (designed) risk specification, such that the satisfaction of Eq. 2 results in the probability of the system becoming unsafe being bounded from above by rho, a design specification. By layering this PRA-CBF-QP as a filter for the nominal MPC policy and then using the PRA-CBF to evaluate the risk of these predicted trajectories, the controller of the present disclosure is able to provide a more accurate assessment of the risk incurred by the system and ensure that it remains at an acceptable level. Any nominal control inputs not satisfying the above condition will be modified by the QP in order to meet the specification. The solution to the QP (u*) is then digitally transmitted to the plant, which, in simulation, is the 'ground truth' model given by the SDE in Eq. 1 and is integrated forward in time using numerical integration techniques to produce the state x for subsequent timesteps, and which, for a physical TTS, is the exact mathematical expression that captures how the state of the physical system changes based on transmitting u* to the various system actuators (e.g., gas/brake pedals, steering wheel, etc.).

Figure 5A:
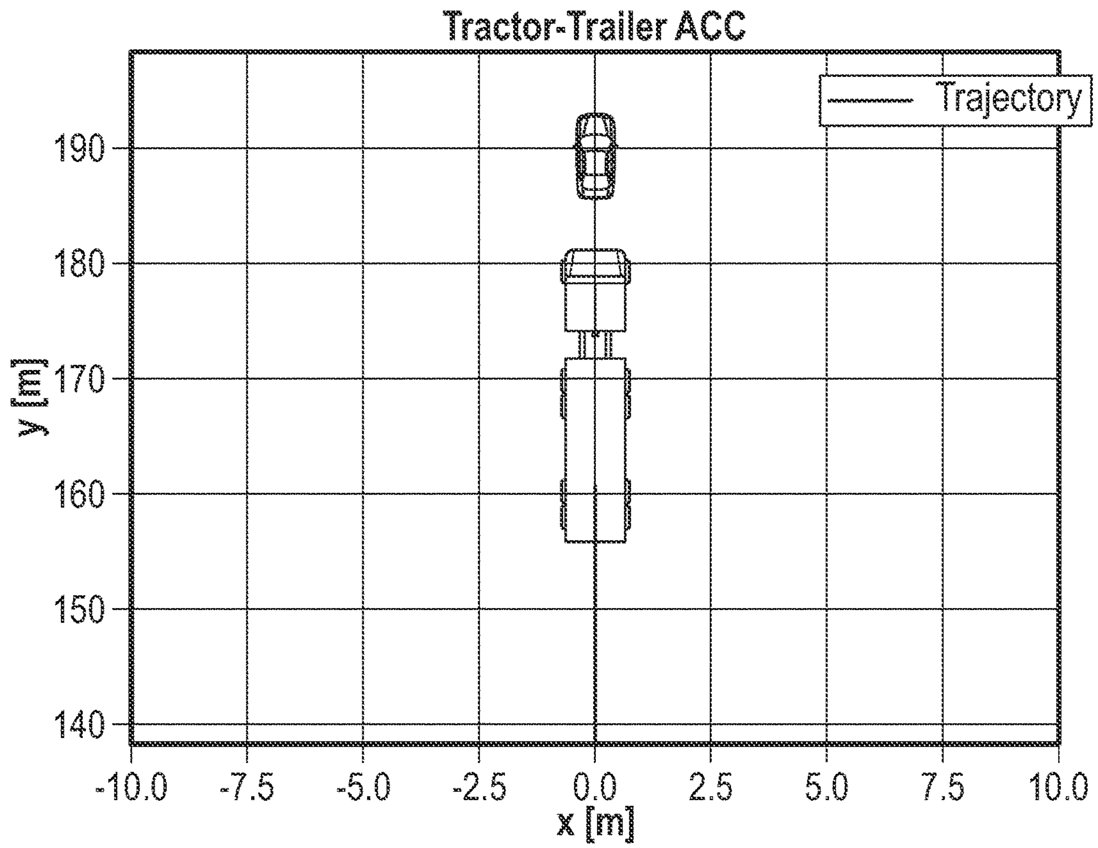
FIGS. 5A-5B are graphs of conservative (5A) and aggressive (5B) actions from the MPC+PRA-CBF controller for the adaptive cruise control problem.
Figure 5B:
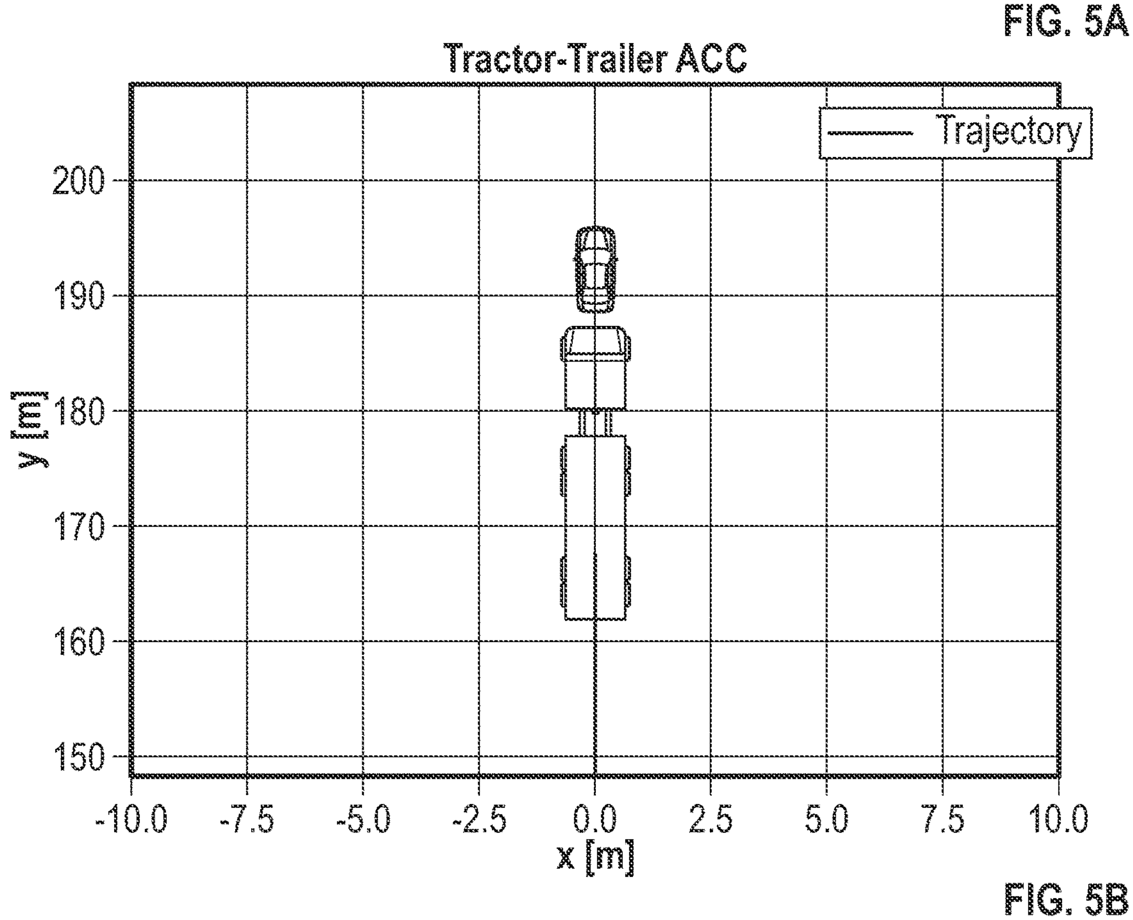

In experimentation of the present disclosure, the efficacy of the proposed controller was demonstrated on three distinct TTS scenarios: 1) an adaptive cruise control ("ACC") problem for highway driving, 2) circumventing a roundabout, and 3) executing a right-turn in the presence of both static and dynamic obstacles. FIGS. 5A-5B are graphs of conservative (5A) and aggressive (5B) actions from the MPC+PRA-CBF controller for the ACC problem. Both remain safe with respect to the specified minimum safety distance.

As can be seen in FIGS. 5A-5B, for the ACC scenario, the TTS was simulated using both aggressive and conservative control parameters (in the sense of minimum admissible following distance). The x and y axes represent lateral and longitudinal distance respectively. The topmost box represents the lead (non-ego) car, the second box represents the truck in the tractor-trailer system, and the third lowermost box is the trailer. In both cases, the TTS obeyed the distance constraint despite the MPC policy requesting the TTS accelerate to maintain its desired speed. Snapshots of minimum following distances in the two scenarios are shown.

Figure 6A:
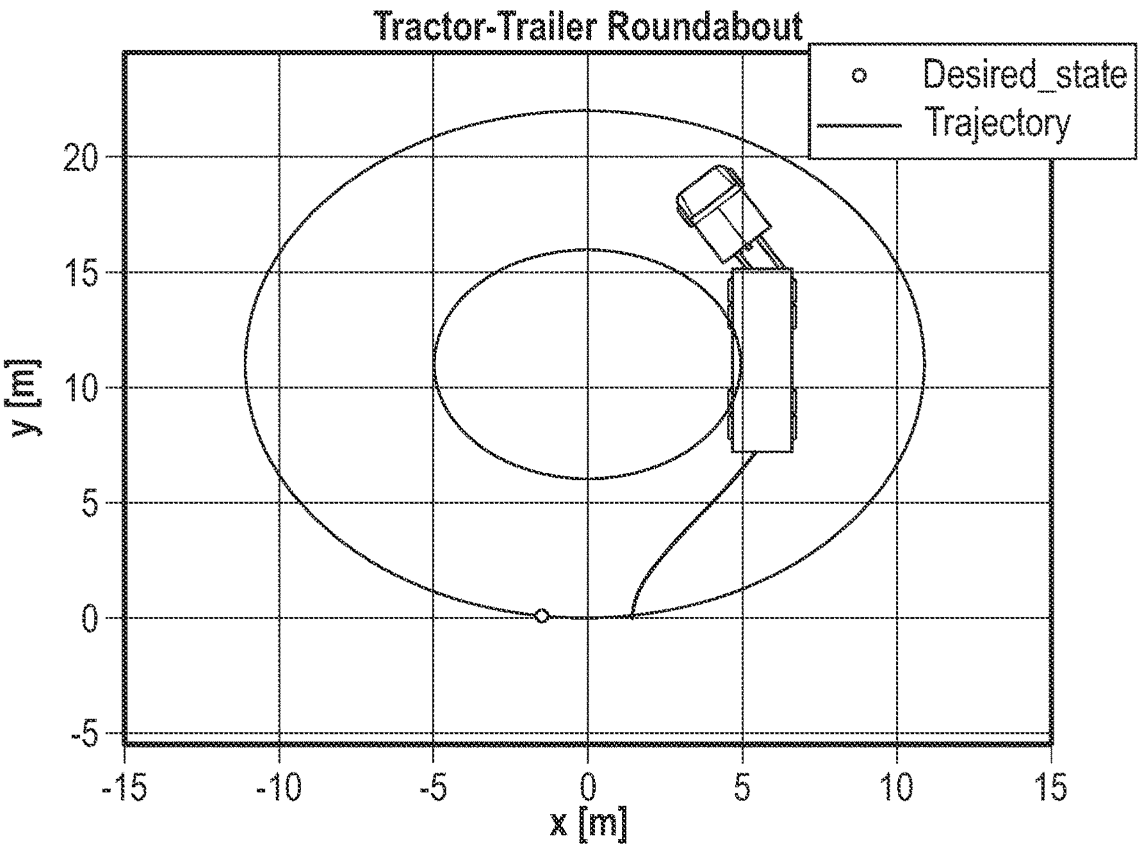
FIGS. 6A, 6B and 6C are graphs illustrating various scenarios for a TTS in a roundabout using embodiments of the present disclosure.

For the roundabout scenario, a set of comparative studies were undertook to highlight the effect of the PRA-CBF-QP filter on top of the nominal MPC control law: i) no CBF filter, ii) PRA-CBF filter for collision avoidance only on the truck, but not the trailer, and iii) PRA-CBF filter for collision avoidance for both the truck and trailer. FIG. 6A is a graph of the MPC only, with no PRA-CBF filter scenario. Here, with no PRA-CBF filter, it may be seen that the TTS does not take a wide enough turn around the roundabout and ends up crashing into the center of the roundabout. The nominal MPC policy is not enough to preserve safety.

Figure 6B:
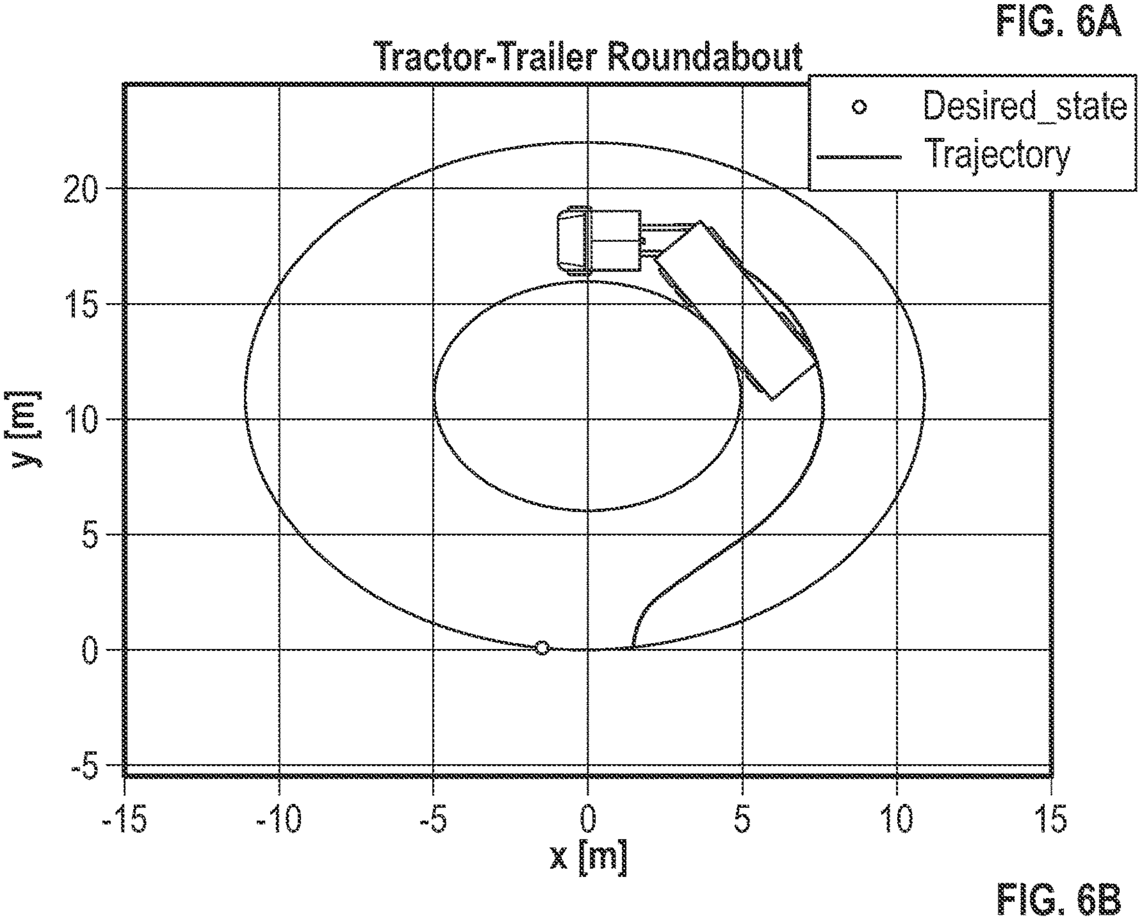

FIG. 6B is a graph of the MPC with just a PRA-CBF filter for collision avoidance for the truck (but not the trailer), which may model an inexperienced human driver. Here, the TTS takes a wider turn and therefore makes it further in the maneuver but still it is not enough to prevent a collision with the center of the roundabout.

Figure 6C:
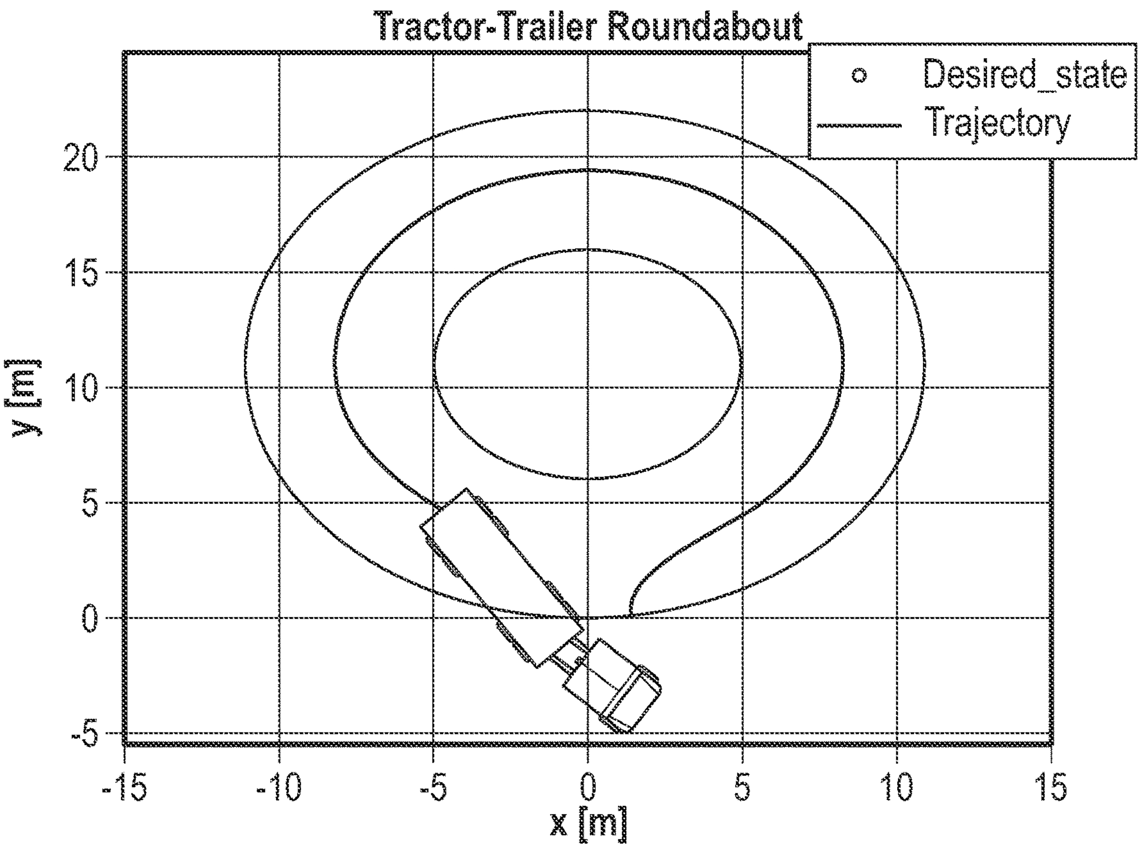

FIG. 6C is a graph of the third scenario, the MPC+PRA-CBF filters for collision avoidance with respect to both the truck and trailer. Here, it can be seen the TTS is able to successfully complete the roundabout maneuver without incurring a collision.

Figure 7:
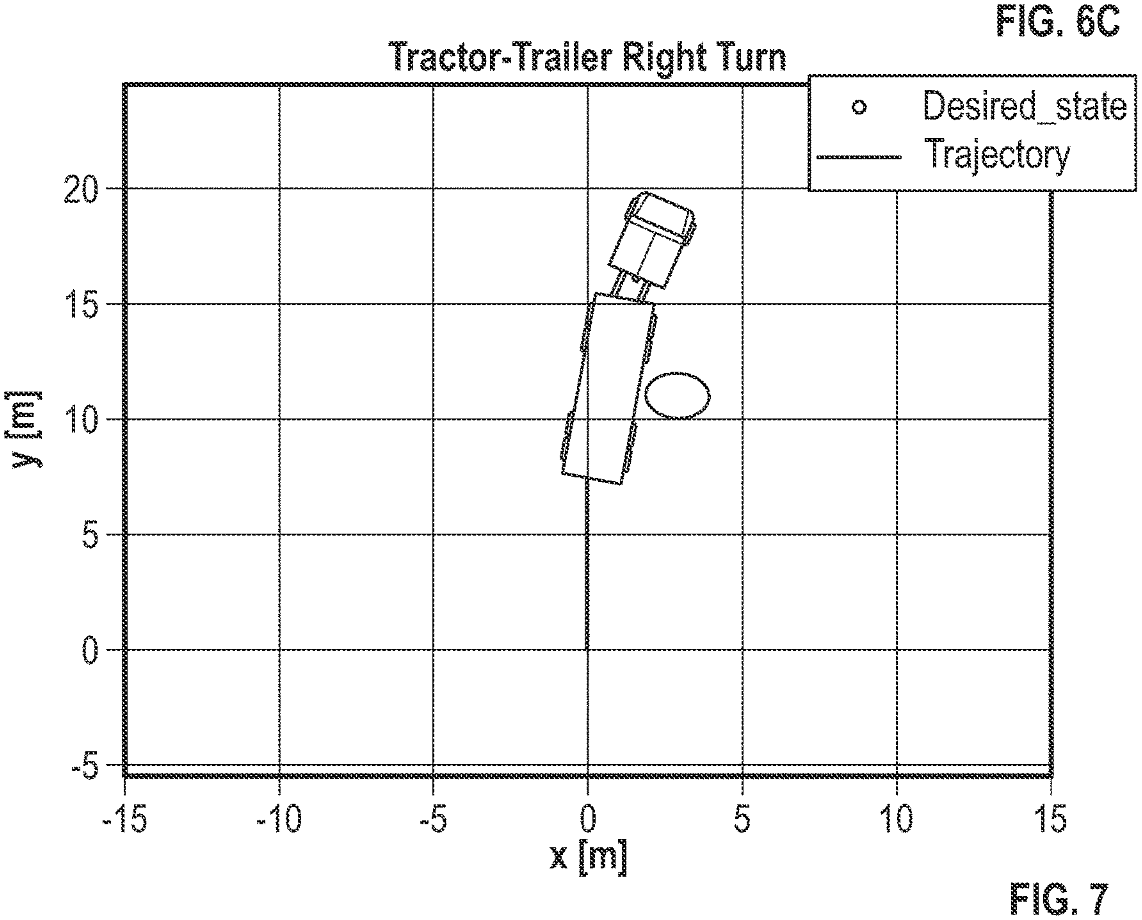
FIG. 7 is a graph reflecting a simulation with a static obstacle which leads to an emergency stop, according to certain illustrative embodiments of the present disclosure.

For the right-turn scenario, cases where the TTS was asked to execute a right-turn in the presence of both a static and dynamic obstacle were simulated. FIG. 7 is a graph reflecting the simulation with a static obstacle which leads to an emergency stop. As shown, the controller was able to predict that a collision was imminent and employ an emergency-stop before colliding with the obstacle. By tuning the parameters in the QP objective function, preference to modify the desired control action by either steering or braking was initiated, and in this illustrated case the preference was tuned to braking. The parameters may be tuned in a variety of ways including, for example, by examining performance of the parameters in a simulation.

Figure 8A:
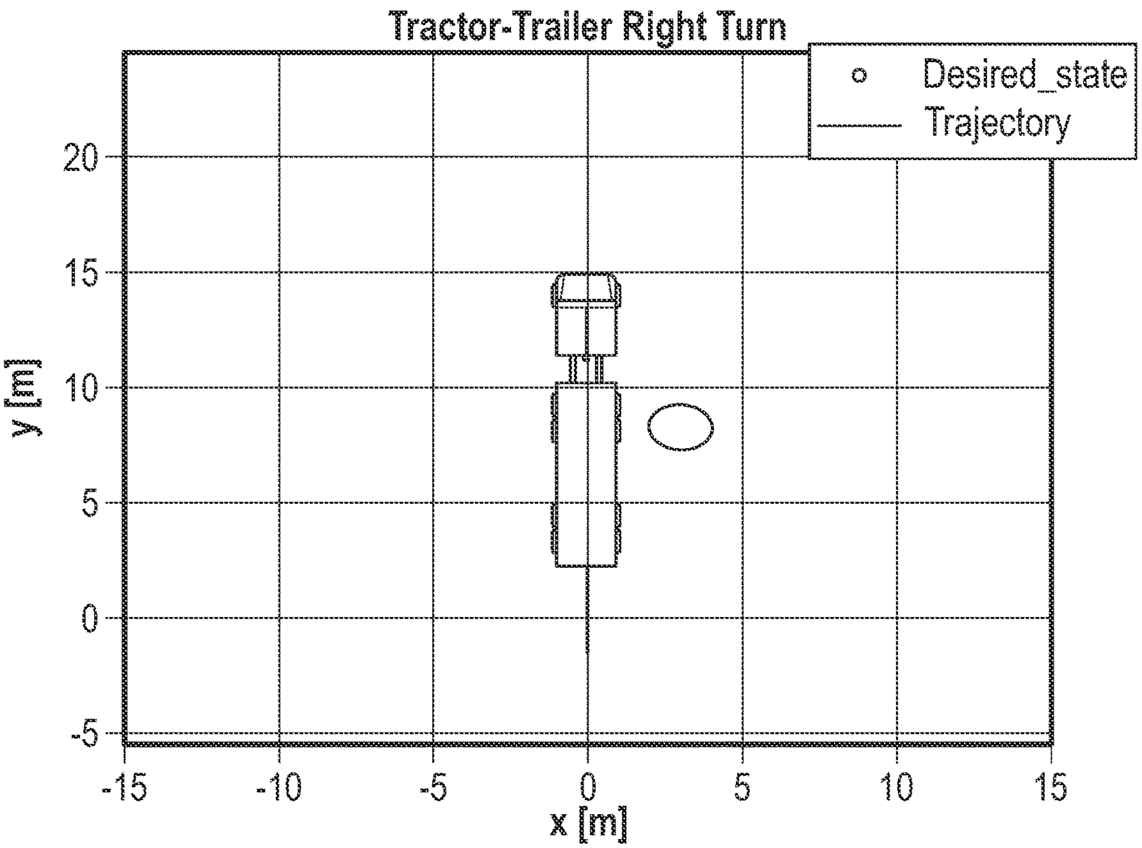
FIGS. 8A, 8B, and 8C are sequential graphs of the fast-moving obstacles (moving along the same axis as the tractor-trailer).
Figure 8B:
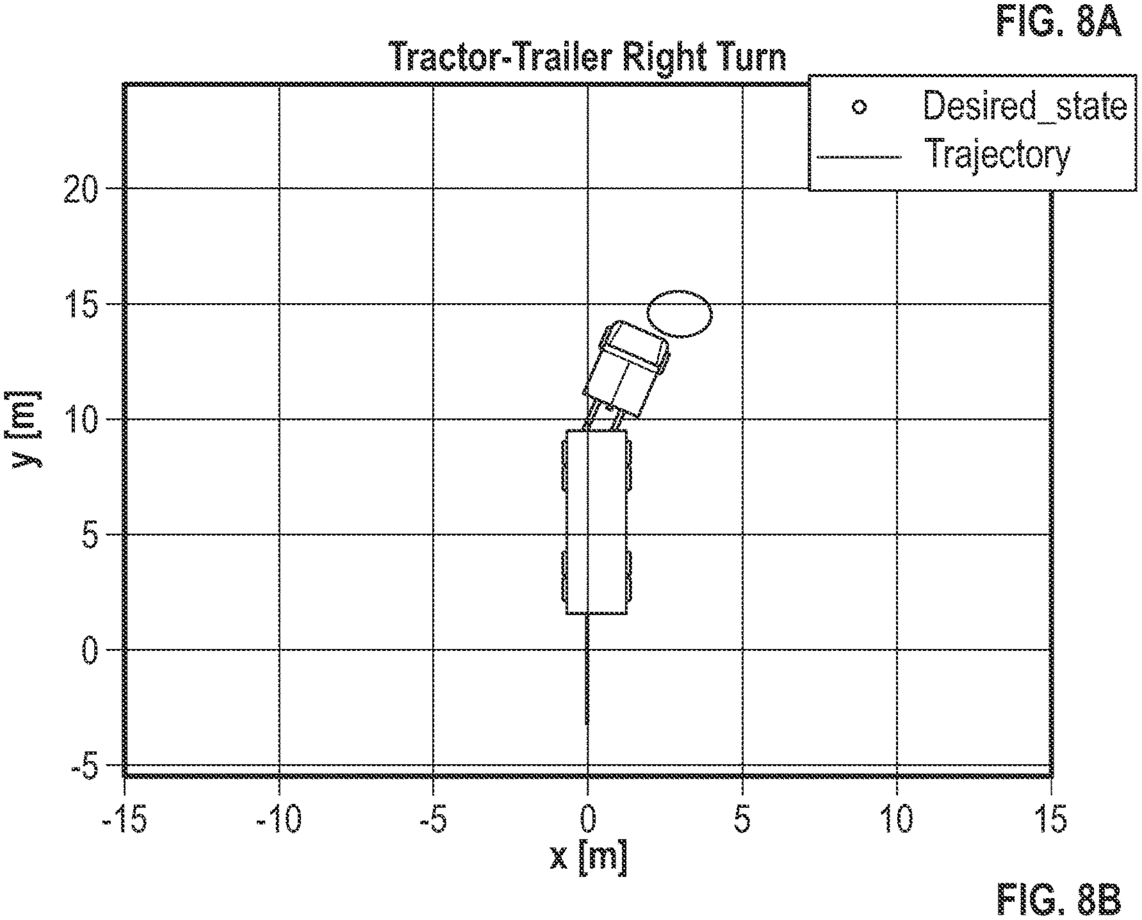
Figure 8C:
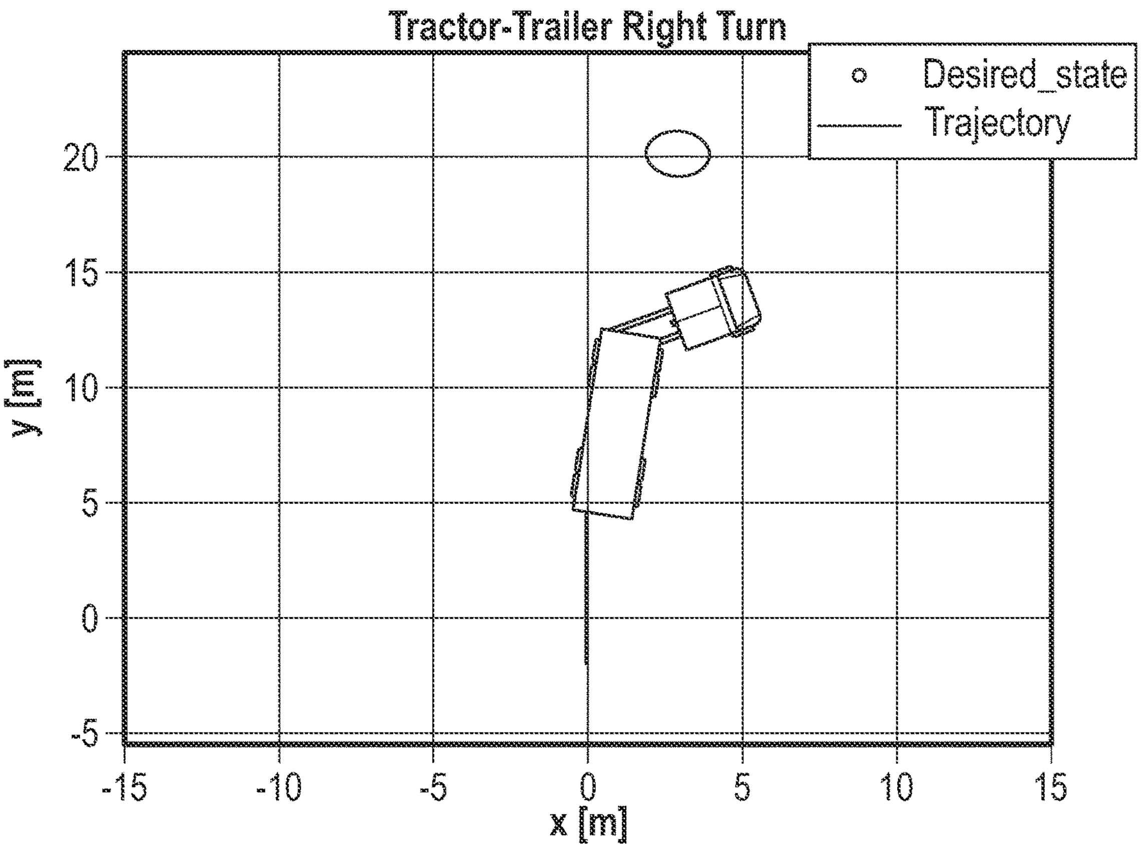

For the case of a dynamic obstacle, we considered both fast- and slow-moving obstacles. FIGS. 8A, 8B, and 8C are sequential graphs of the fast-moving obstacles (moving along the same axis as the tractor-trailer). For the fast-moving obstacle, the controller again predicted that a collision would occur in the nominal trajectories and therefore slowed and waited for the obstacle to pass before proceeding with the right-turn maneuver.

Figure 9A:
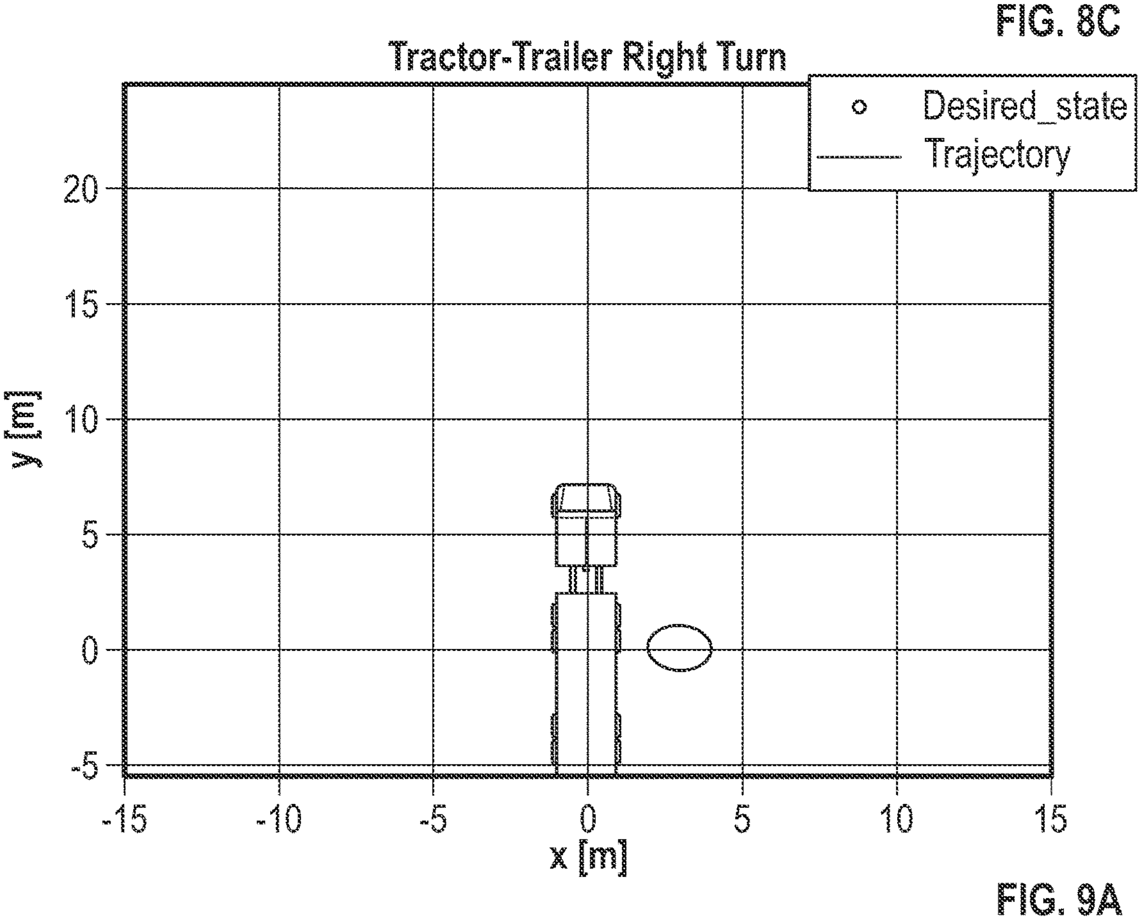
FIGS. 9A, 9B and 9C are sequential graphs for the slow-moving obstacle scenario (also moving along the same obstacle of the tractor-trailer).
Figure 9B:
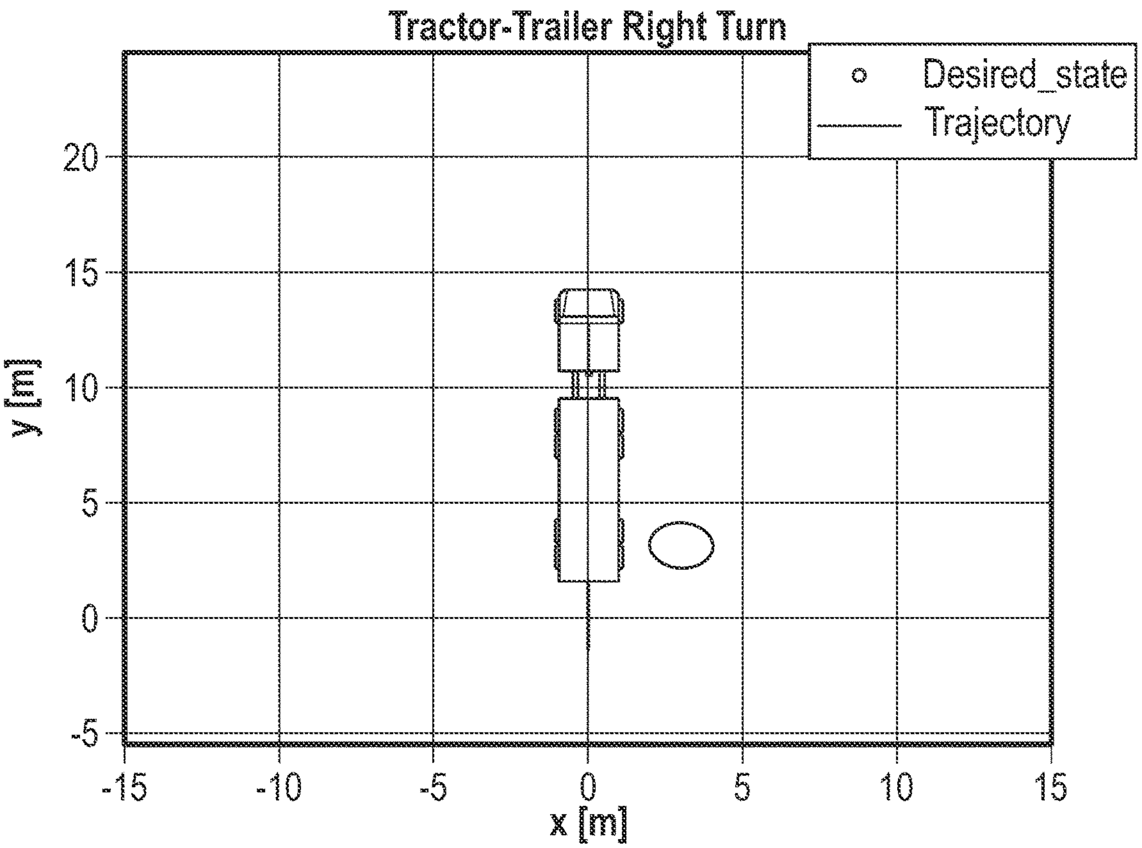
Figure 9C:
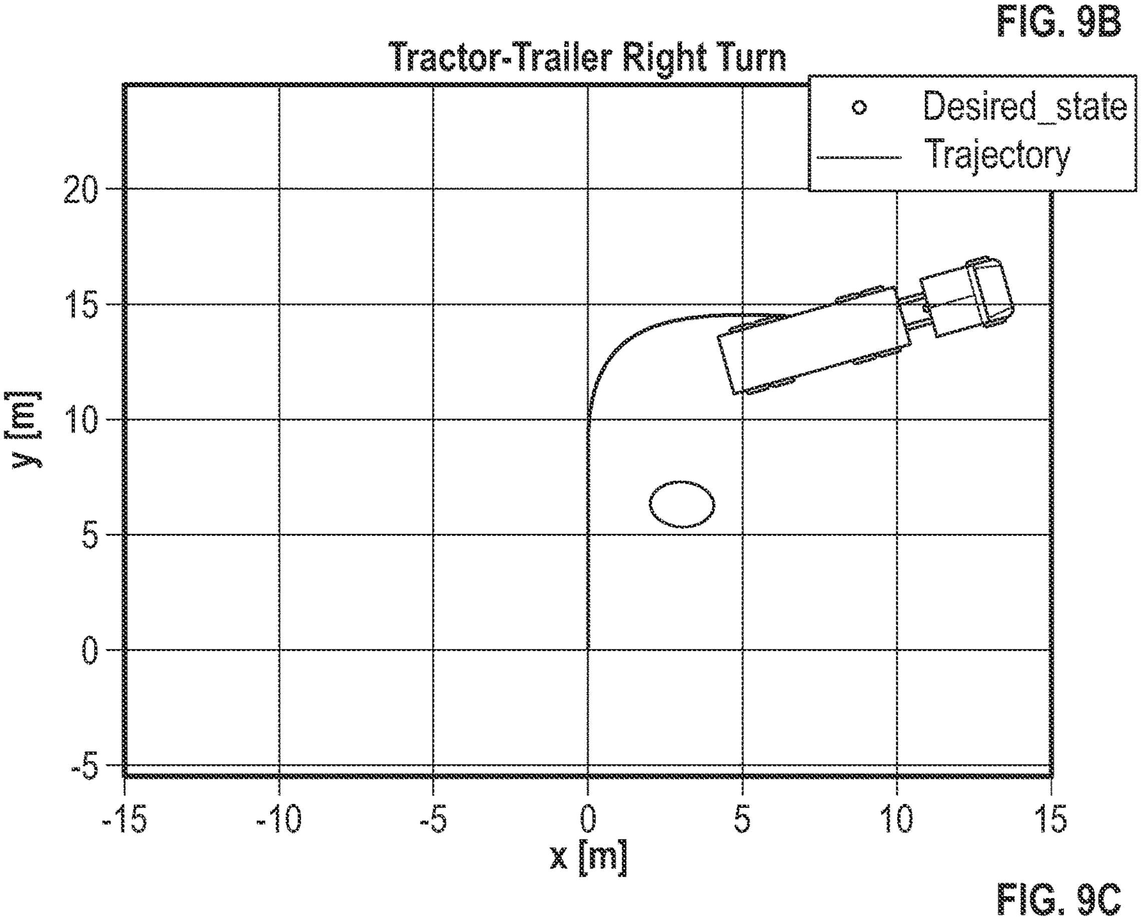

FIGS. 9A, 9B and 9C are sequential graphs for the slow-moving obstacle scenario (also moving along the same obstacle of the tractor-trailer). When the obstacle was slow-moving, the system correctly predicted that no collision would occur and therefore proceeded without waiting for the obstacle to pass.

In the illustrative embodiments disclosed herein, command module 230 may contain a variety of models for modeling movement, state estimations or other actions of vehicle 100 or other vehicles. Such models are discussed in co-pending U.S. patent application Ser. No. 18/108,453 entitled "SYSTEMS AND METHODS FOR RISK-BOUNDED CONTROL BARRIER FUNCTIONS," filed on Feb. 10, 2023, naming Black et al. as inventors, which is hereby incorporated by reference in its entirety.

Referring back to FIGS. 1-3, in some embodiments, command module 230 may plan a trajectory for vehicle 100 or other vehicles and devices. In some embodiments, command module 230 may plan a trajectory based on start-to-goal motion planning. In some embodiments, command module 230 may plan a trajectory based on obstacles, features, landmarks, road signs, traffic controls, lane markings or other road boundary indicators, weather conditions, traffic conditions, or other characteristics. In some embodiments, command module 230 may plan a trajectory based on the characteristics relevant to an industrial or medical environment, such as build surface, tissue damage, etc. In some embodiments, command module 230 may rely on automated driving assistance via automated driving module(s) 160 to determine a trajectory for vehicle 100 or other vehicles and devices.

In some embodiments, command module 230 may generate nominal control inputs for vehicle 100 or other vehicles and devices based on a trajectory. For example, command module 230 based on a trajectory may generate nominal control inputs in terms of steering angle, acceleration, braking, and so on. As another example, command module 230 based on a trajectory may generate nominal control inputs actuating one or more actuators of a medical or robotic device.

With reference to FIG. 3, vehicle 100 may be connected to a network 305, which allows for communication between vehicle 100 and cloud servers (e.g., cloud server 310), infrastructure devices (e.g., infrastructure device 340), other vehicles (e.g., vehicle 380), and any other systems connected to network 305. With respect to network 305, such a network may use any form of communication or networking to exchange data, including but not limited to the Internet, Directed Short Range Communication (DSRC) service, LTE, 5G, millimeter wave (mmWave) communications, and so on.

The cloud server 310 is shown as including a processor 315 that may be a part of the PRA-CBF system 170 through network 305 via communication system 335. In one embodiment, the cloud server 310 includes a memory 320 that stores a communication module 325. The memory 320 is a random-access memory (RAM), read-only memory (ROM), a hard-disk drive, a flash memory, or other suitable memory for storing the module 325. The module 325 is, for example, computer-readable instructions that when executed by the processor 315 cause the processor 315 to perform the various functions disclosed herein. Moreover, in one embodiment, cloud server 310 includes the database 330. The database 330 is, in one embodiment, an electronic data structure stored in the memory 320 or another data store and that is configured with routines that can be executed by the processor 315 for analyzing stored data, providing stored data, organizing stored data, and so on.

The infrastructure device 340 is shown as including a processor 345 that may be a part of the PRA-CBF system 170 through network 305 via communication unit 370. In one embodiment, the infrastructure device 340 includes a memory 350 that stores a communication module 355. The memory 350 is a random-access memory (RAM), read-only memory (ROM), a hard-disk drive, a flash memory, or other suitable memory for storing the module 355. The module 355 is, for example, computer-readable instructions that when executed by the processor 345 cause the processor 345 to perform the various functions disclosed herein. Moreover, in one embodiment, infrastructure device 340 includes the database 360. The database 360 is, in one embodiment, an electronic data structure stored in the memory 350 or another data store and that is configured with routines that can be executed by the processor 345 for analyzing stored data, providing stored data, organizing stored data, and so on.

Accordingly, in addition to information obtained from sensor data 250, PRA-CBF system 170 may obtain information from cloud servers (e.g., cloud server 310), infrastructure devices (e.g., infrastructure device 340), other vehicles (e.g., vehicle 380), and any other systems connected to network 305. For example, command module 230 may receive external parameters (e.g., environmental parameters), vehicle parameters, contextual parameters, or other parameters via network 305. As another example, command module 230 may receive additional information, such as state estimations, trajectories, control inputs, and so on, such as for instance as they relate to other vehicles and devices, via network 305.

It should be appreciated that the command module 230 in combination with a prediction model 270 can form a computational model such as a machine learning logic, deep learning logic, a neural network model, or another similar approach. In one embodiment, the prediction model 270 is a statistical model such as a regression model that determines estimates of the state of a vehicle based on sensor data 250, map data 116, or other sources of information as described herein. Accordingly, the model 270 can be a polynomial regression (e.g., least weighted polynomial regression), least squares or another suitable approach.

Moreover, in alternative arrangements, the prediction model 270 is a probabilistic approach such as a hidden Markov model. In either case, the command module 230, when implemented as a neural network model or another model, in one embodiment, electronically accepts the sensor data 250 as an input, which may also include evaluation metrics. Accordingly, the command module 230 in concert with the prediction model 270 produce various determinations/assessments as an electronic output that characterizes the noted aspect as, for example, a single electronic value. Moreover, in further aspects, the PRA-CBF system 170 can collect the noted data, log responses, and use the data and responses to subsequently further train the model 270.

Figure 10:
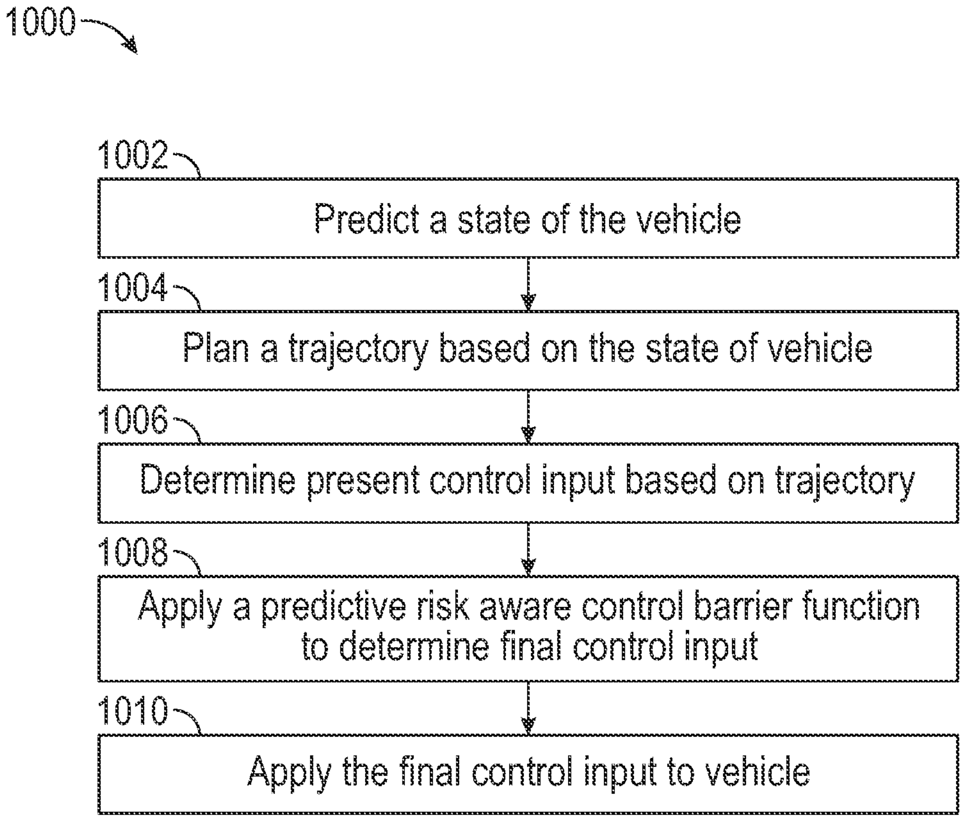
FIG. 10 illustrates one embodiment of a method for using an PRA-CBF system for implementing predictive risk-bounded control barrier functions with a vehicle system.

Additional aspects of implementing risk-bounded control barrier functions will be discussed in relation to FIG. 10. FIG. 10 is a flowchart of a method 1000 that is associated with implementing illustrative predictive risk-bounded control barrier functions of the present disclosure. Method 1000 will be discussed from the perspective of the PRA-CBF system 170 of FIGS. 1 and 2. While method 1000 is discussed in combination with the PRA-CBF system 170, it should be appreciated that the method 1000 is not limited to being implemented within the PRA-CBF system 170 but is instead one example of a system that may implement the method 1000.

At 1002, command module 230 predicts the state of a vehicle. For example, command module 230 may predict the state of a vehicle based on modelling the movement or other actions of the vehicle. In some embodiments, command module 230 may predict the state of each vehicle in terms of its location, velocity, acceleration, heading, or other characteristics. In some embodiments, command module may predict a state in three or more dimensions (e.g., x, y, z; quaternion) or with respect to a non-Cartesian coordinate system (e.g., polar coordinate system). In some embodiments, command module 230 may use extended Kalman filtering in performing state estimation.

At 1004, command module 230 plans a trajectory based on the state of the vehicle. For example, command module 230 may plan a trajectory based on start-to-goal motion planning. In some embodiments, command module 230 may plan a trajectory based on obstacles, features, landmarks, road signs, traffic controls, lane markings or other road boundary indicators, weather conditions, traffic conditions, or other characteristics. In some embodiments, command module 230 may plan a trajectory based on the characteristics relevant to an industrial environment, such as build surface, etc. In some embodiments, command module 230 may rely on automated driving assistance via automated driving module(s) 160 to determine a trajectory for vehicle 100 or other vehicles.

At 1006, command module 230 determines a present control input based on the trajectory. For example, command module 230 based on a trajectory may generate present control inputs in terms of steering angle, acceleration, braking, and so on. In some embodiments, command module 230 may rely on automated driving assistance via automated driving module(s) 160 to determine a nominal control input based on the trajectory.

At 1008, command module 230 applies the PRA-CBF methods described herein to determine a final control input. In determining the final control input, using the PRA-CBF, the command module takes the predicted control input into account when assessing risks associated with the present control input. Here, as described, the PRA-CBF is applied as a filter for the MPC policy, thus allowing the system controller to provide an accurate assessment of the risk incurred by the system and ensure it remains at an acceptable level.

At 1010, command module 230 applies the final control input to the vehicle. In some embodiments, command module 230 may apply the final control input by sending an instruction to a vehicle, device, or a mechanical system component therein to implement the final control input.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known, or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively or communicably coupled/connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the PRA-CBF system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement, speed, maneuvering, heading, direction, etc. of the vehicle 100. The processor(s) 110, the PRA-CBF system 170, and/or the automated driving module(s) 160 may control some or all of these vehicle systems 140 and, thus, may be partially or fully autonomous.

The processor(s) 110, the PRA-CBF system 170, and/or the automated driving module(s) 160 can be operatively connected to communicate with the various vehicle systems 140 and/or individual components thereof. For example, returning to FIG. 1, the processor(s) 110, the RB-CBF system 170, and/or the automated driving module(s) 160 can be in communication to send and/or receive information from the various vehicle systems 140 to control the movement, speed, maneuvering, heading, direction, etc. of the vehicle 100. The processor(s) 110, the RB-CBF system 170, and/or the automated driving module(s) 160 may control some or all of these vehicle systems 140.

The processor(s) 110, the PRA-CBF system 170, and/or the automated driving module(s) 160 may be operable to control the navigation and/or maneuvering of the vehicle 100 by controlling one or more of the vehicle systems 140 and/or components thereof. For instance, when operating in an autonomous mode, the processor(s) 110, the PRA-CBF system 170, and/or the automated driving module(s) 160 can control the direction and/or speed of the vehicle 100. The processor(s) 110, the PRA-CBF system 170, and/or the automated driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof responsive to receiving signals or other inputs from the processor(s) 110 and/or the automated driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor (s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the PRA-CBF system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. In general, the automated driving module(s) 160 may function to implement different levels of automation, including advanced driving assistance (ADAS) functions, semi-autonomous functions, and fully autonomous functions. "Driving maneuver" means one or more actions that affect the movement of a vehicle. Examples of driving maneuvers include accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
- a processor; and
- a memory communicably coupled to the processor and storing machine-readable instructions that, when executed by the processor, cause the processor to:
  - predict a future state of a vehicle;
  - plan a trajectory based on the future state of the vehicle;
  - determine a present control input based on the trajectory;
  - apply a predictive risk-aware control barrier function ("PRA-CBF") to assess a risk associated with the present control input, wherein:
    - a predicted control input is taken into account during the risk assessment;
    - the PRA-CBF bounds a probability of constraint violation by a user-specified value over a time interval; and
    - the PRA-CBF certifies that a risk threshold will be satisfied;
  - determine, based on the certification the risk threshold is satisfied, a final control input;
  - execute the final control input on the vehicle.

2. The system of claim 1, wherein the vehicle is a ground, water or airborne vehicle.

3. The system of claim 2, wherein the ground vehicle is a tractor-trailer.

4. The system of claim 1, wherein the PRA-CBF applies:
- one or more constraints comprising at least one of an obstacle or collision avoidance, speed limit, or truck-trailer jackknife angle; and
- a finite operating time interval.

5. The system of claim 1, wherein the future state of the vehicle is at least one of a location, heading, or velocity.

6. The system of claim 1, wherein the machine-readable instruction to apply the PRA-CBF is implemented via a quadratic program.

7. The system of claim 1, wherein the system is an Advanced Driver Assistance System or Automated Driving System.

8. The system of claim 1, wherein the PRA-CBF takes a sequence of predicted control inputs derived from the planned trajectory over a prediction time horizon into account when assessing risks associated with the present control input.

9. A non-transitory computer-readable medium including instructions that, when executed by one or more processors, cause the one or more processors to:
- predict a future state of a vehicle;
- plan a trajectory based on the future state of the vehicle;
- determine a present control input based on the trajectory;
- apply a predictive risk-aware control barrier function ("PRA-CBF") to assess a risk associated with the present control input, wherein:
  - a predicted control input is taken into account during the risk assessment;
  - the PRA-CBF bounds a probability of constraint violation by a user-specified value over a time interval; and
  - the PRA-CBF certifies that a risk threshold will be satisfied;
- determine, based on the certification the risk threshold is satisfied, a final control input; and
- execute the final control input on the vehicle.

10. The non-transitory computer-readable medium of claim 9, wherein the vehicle is a ground, water or airborne vehicle.

11. The non-transitory computer-readable medium of claim 10, wherein the ground vehicle is a tractor-trailer.

12. The non-transitory computer-readable medium of claim 9, wherein the PRA-CBF applies:
- one or more constraints comprising at least one of an obstacle or collision avoidance, speed limit, or tractor-trailer jackknife angle; and
- a finite operating time interval.

13. The non-transitory computer-readable medium of claim 9, wherein the future state of the vehicle is at least one of a location, heading, or velocity.

14. The non-transitory computer-readable medium of claim 9, wherein the PRA-CBF is implemented via a quadratic program.

15. The non-transitory computer-readable medium of claim 9, wherein the one or more processors comprise part of an Advanced Driver Assistance System or Automated Driving System.

16. The non-transitory computer-readable medium of claim 9, wherein the PRA-CBF takes a sequence of predicted control inputs derived from the planned trajectory over a prediction time horizon into account when assessing risks associated with the present control input.

17. A method, comprising:
- predicting a future state of a vehicle;
- planning a trajectory based on the future state of the vehicle;
- determining a present control input based on the trajectory;
- applying a predictive risk-aware control barrier function ("PRA-CBF") to assess a risk associated with the present control input, wherein:
  - a predicted control input is taken into account during the risk assessment;
  - the PRA-CBF bounds a probability of constraint violation by a user-specified value over a time interval; and
  - the PRA-CBF certifies that a risk threshold will be satisfied;
- determining, based on the certification the risk threshold is satisfied, a final control input; and
- executing the final control input on the vehicle.

18. The method of claim 17, wherein the vehicle is a ground, water or airborne vehicle.

19. The method of claim 18, wherein the ground vehicle is a tractor-trailer.

20. The method of claim 17, wherein the PRA-CBF applies:

one or more constraints comprising at least one of an obstacle or collision avoidance, speed limit, or truck-trailer jackknife angle; and a finite operating time interval.

21. The method of claim 17, wherein the future state of the vehicle is at least one of a location, heading, or velocity.

22. The method of claim 17, wherein the PRA-CBF is implemented via a quadratic program.

23. The method of claim 17, wherein the PRA-CBF takes a sequence of predicted control inputs derived from the planned trajectory over a prediction time horizon into account when assessing risks associated with the present control input.

* * * * *